(12) United States Patent
Hosono et al.

(10) Patent No.: US 9,981,845 B2
(45) Date of Patent: May 29, 2018

(54) CATALYST FOR PRODUCING HYDROGEN AND METHOD FOR PRODUCING HYDROGEN

(71) Applicant: TOKYO INSTITUTE OF TECHNOLOGY, Tokyo (JP)

(72) Inventors: Hideo Hosono, Tokyo (JP); Fumitaka Hayashi, Tokyo (JP); Toshiharu Yokoyama, Tokyo (JP); Yoshitake Toda, Tokyo (JP); Michikazu Hara, Tokyo (JP); Masaaki Kitano, Tokyo (JP)

(73) Assignees: TOKYO INSTITUTE OF TECHNOLOGY, Tokyo (JP); JAPAN SCIENCE AND TECHNOLOGY AGENCY, Kawaguchi-shi, Saitama (JP)

( * ) Notice: Subject to any disclaimer, the term of this patent is extended or adjusted under 35 U.S.C. 154(b) by 0 days. days.

(21) Appl. No.: 15/211,599

(22) Filed: Jul. 15, 2016

(65) Prior Publication Data

US 2016/0340182 A1 Nov. 24, 2016

Related U.S. Application Data

(62) Division of application No. 14/429,274, filed as application No. PCT/JP2013/072182 on Aug. 20, 2013, now abandoned.

(30) Foreign Application Priority Data

Sep. 20, 2012 (JP) ................................ 2012-207548

(51) Int. Cl.
*B01J 23/58* (2006.01)
*C01B 3/04* (2006.01)
(Continued)

(52) U.S. Cl.
CPC ............... *C01B 3/047* (2013.01); *B01J 21/16* (2013.01); *B01J 23/58* (2013.01); *B01J 23/78* (2013.01);
(Continued)

(58) Field of Classification Search
CPC ........ C01B 3/047; C01B 3/04; B01J 37/0207; B01J 37/10; B01J 37/0238; B01J 35/0006;
(Continued)

(56) References Cited

U.S. PATENT DOCUMENTS 6,696,614 B2 2/2004 Pollesel et al.
7,867,300 B2 1/2011 Chellappa et al.
(Continued)

FOREIGN PATENT DOCUMENTS

CA 2812521 A1 * 6/2012 ............ B01J 35/002
JP 01-119341 A 5/1989
(Continued)

OTHER PUBLICATIONS

International Search Report dated Nov. 26, 2013, issued in corresponding application No. PCT/JP2013/072182.
(Continued)

*Primary Examiner* — Haytham Soliman
(74) *Attorney, Agent, or Firm* — Westerman, Hattori, Daniels & Adrian, LLP (57) ABSTRACT

A metal-supporting catalyst for decomposing ammonia into hydrogen and nitrogen. The catalyst shows a high performance with a low cost and being advantageous from the viewpoint of resources, and an efficient method for producing hydrogen using the catalyst. The catalyst catalytically decomposes ammonia gas to generate hydrogen. The hydrogen generation catalyst includes, as a support, a mayenite type compound having oxygen ions enclosed therein or a
(Continued)

mayenite type compound having $10^{15}$ cm$^{-3}$ or more of conduction electrons or hydrogen anions enclosed therein, and metal grains for decomposing ammonia are supported on the surface of the support. Hydrogen is produced by continuously supplying 0.1-100 vol % of ammonia gas to a catalyst layer that comprises the aforesaid catalyst, and reacting the same at a reaction pressure of 0.01-1.0 MPa, at a reaction temperature of 300-800° C. and at a weight hourly space velocity (WHSV) of 500/mlg$^{-1}$h$^{-1}$ or higher.

10 Claims, 1 Drawing Sheet

(51) Int. Cl.
| | |
|---|---|
| B01J 37/18 | (2006.01) |
| B01J 37/34 | (2006.01) |
| B01J 21/16 | (2006.01) |
| B01J 35/00 | (2006.01) |
| B01J 35/10 | (2006.01) |
| B01J 37/02 | (2006.01) |
| H01M 8/0606 | (2016.01) |
| B01J 37/08 | (2006.01) |
| B01J 37/16 | (2006.01) |
| B01J 23/78 | (2006.01) |
| B01J 37/10 | (2006.01) |

(52) U.S. Cl.
CPC ......... *B01J 35/0006* (2013.01); *B01J 35/006* (2013.01); *B01J 35/0013* (2013.01); *B01J 35/0033* (2013.01); *B01J 35/0066* (2013.01); *B01J 35/1009* (2013.01); *B01J 35/1014* (2013.01); *B01J 37/0203* (2013.01); *B01J 37/0207* (2013.01); *B01J 37/0238* (2013.01); *B01J 37/08* (2013.01); *B01J 37/10* (2013.01); *B01J 37/16* (2013.01); *B01J 37/18* (2013.01); *B01J 37/348* (2013.01); *C01B 3/04* (2013.01); *H01M 8/0606* (2013.01); *Y02E 60/324* (2013.01); *Y02E 60/364* (2013.01)

(58) Field of Classification Search
CPC .... B01J 35/0066; B01J 35/1009; B01J 37/08; B01J 37/16; B01J 23/58; B01J 23/78; B01J 37/348; B01J 35/0013; B01J 21/16; B01J 37/0203; B01J 35/006; B01J 35/0033; B01J 37/18; H01M 8/0606; Y02E 60/324; Y02E 60/364
USPC .................................. 502/300, 330; 423/363
See application file for complete search history.

(56) References Cited

U.S. PATENT DOCUMENTS

| | | | |
|---|---|---|---|
| 2005/0279279 A1 | 12/2005 | Hosono et al. | |
| 2006/0039847 A1* | 2/2006 | Kaboord | B01D 15/00 423/359 |
| 2013/0183224 A1 | 7/2013 | Hosono et al. | |

FOREIGN PATENT DOCUMENTS

| | | |
|---|---|---|
| JP | 08-084910 A | 4/1996 |
| JP | 2003-040602 A | 2/2003 |
| JP | 2008-536795 A | 9/2008 |
| JP | 2010-094668 A | 4/2010 |
| JP | 2010-110697 A | 5/2010 |
| JP | 2010-207783 A | 9/2010 |
| JP | 2012-025636 A | 2/2012 |
| JP | 2012-101945 A | 5/2012 |
| JP | 2012-161713 A | 8/2012 |
| WO | 03/089373 A1 | 10/2003 |
| WO | 2005/000741 A1 | 1/2005 |
| WO | 2008/087774 A1 | 7/2008 |
| WO | 2012/077658 A1 | 6/2012 |

OTHER PUBLICATIONS

Yakerson, et al., Scientific Bases for the Preparation of New Cement-Containing Catalysts, Preparation of Catalysts VI, 1995, 91, pp. 879-884.

Hands Bartl, et al., "Zur Struktur des 12CaO.7Al2O3", N. Jahrbuch F. Mineralogie. Monatshefte, 1970, 35, pp. 547-552.

Matsuishi, et al., "High-Density Electron Anions in a Nanoporous Single Crystal: [Ca24Al28O64]4+ (4e–)", Science, Aug. 1, 2003, vol. 301, pp. 626-629.

Hayashi, et al., Hydride Ion as a Two-Electron Donor in a Nanoporous Crystalline Semiconductor 12CaO.7Al2O3, Journal of Physical Chemistry B, 2005, 109, pp. 23886-23842.

Hayashi, et al., "Heavy doping of H– ion in 12CaO.7Al2O3", Journal of Solid State Chemistry, 2011, 184, pp. 1428-1432.

Gong, et al., "Synthesis and characteristics of the C12A7—O-nanoparticles by citric acid sol-gel combustion method", Material Letters, 2010, 64, pp. 1322-1324.

Li, et al., "Synthesis of higher surface area mayenite by hydrothermal method", Materials Research Bulletin, 2011, 46, pp. 1307-1310.

Chunshan Li, Daisuke Hirabayashi, Kenzi Suzuki "Development of new nickel based catalyst for biomass tar steam reforming producing H2-rich syngas" Fuel Processing Technology vol. 90, Issue 6, Jun. 2009, pp. 790-796, Mar. 14, 2009.

\* cited by examiner

CATALYST FOR PRODUCING HYDROGEN AND METHOD FOR PRODUCING HYDROGEN

CROSS-REFERENCE TO RELATED APPLICATION

The present application is a Divisional of U.S. patent application Ser. No. 14/429,274, filed on Mar. 18, 2015, which is a national stage application filed under 35 USC 371 of International Application No. PCT/JP2013/072182, filed Aug. 20, 2013, and which is based upon and claims the benefit of priority from the prior Japanese Patent Application No. 2012-207548, filed on Sep. 20, 2012, the entire contents of which are incorporated herein by reference.

TECHNICAL FIELD

The present invention relates to a catalyst for producing hydrogen and a method for producing hydrogen from ammonia using the catalyst.

BACKGROUND ART

When ammonia contained in various exhaust gases is discharged in the environment, it is necessary to detoxifying ammonia because ammonia has an odor, and for example, a method of oxidatively decomposing ammonia by contact with oxygen, and a method of directly decomposing ammonia to hydrogen, and the like have been proposed. Ammonia decomposition reaction is industrially used for producing atmospheric gas composed of nitrogen and hydrogen used for bright annealing of stainless steel, nickel steel, and the like.

Also, use of hydrogen as a clean energy source has recently attracted attention from the viewpoint of environmental protection and, for example, a method of recovering hydrogen from ammonia produced from organic waste and fuel cell vehicles using hydrogen as fuel have been actively developed. Hydrogen is preferred as clean energy, but particularly when hydrogen is used as a raw material of fuel cells for automobile cars, a method of supplying hydrogen to fuel cells has been a problem because of the necessity for a large volume of storage. As a method for resolving the problem, attention has recently been paid to a method of storing hydrogen as liquid ammonia and producing hydrogen by contact decomposition of vaporized ammonia.

Decomposition reaction of ammonia is volume expansion-type endothermic reaction represented by $2NH_3 \rightarrow 3H_2+N_2$, and thus the reaction at lower pressure and higher temperature is advantageous for reaction equilibrium. Although a high temperature of 800° C. or more, preferably 1000° C. or more, is required for ammonia thermal decomposition, contact decomposition using a catalyst can be performed at a reaction temperature of 300° C. to 700° C.

A catalyst for ammonia synthesis can be considered to be used for ammonia decomposition reaction, but development of a catalyst for ammonia decomposition is required because ammonia decomposition is basically different from ammonia synthesis for two reasons below. The first reasons is that ammonia synthesis reaction is preferably performed under the conditions of a low temperature and high pressure such as 300° C. to 500° C. and 30 MPa due to equilibrium, while ammonia decomposition reaction which is reverse reaction is preferably performed under the conditions of a low pressure and high temperature. The second reason is that a rate-controlling step of ammonia synthesis reaction is activation of nitrogen molecules, while a rate-controlling step of ammonia decomposition reaction is desorption of nitrogen species adsorbed on a catalyst surface and produced by ammonia decomposition.

An optimum catalytic metal for ammonia contact decomposition is ruthenium (Ru) and, for example, there have been proposed a method (Patent Literature 1) in which a catalyst including a basic compound which is added to Ru supported on alumina is used as a catalyst suitable for decomposing ammonia recovered from a coke oven into hydrogen and nitrogen at a middle temperature of 400° C. to 500° C. under the atmospheric pressure, a method (Patent Literature 2) in which a catalyst composed of Ru supported on α-alumina and having a specific surface area of 8.5 to 100 m²/g is used at a reaction temperature of 300° C. to 800° C., a method (Patent Literature 3) in which a catalyst prepared by substituting, with a catalytically active metal such as Ru, a portion of A-sites or B-sites of a perovskite-type composite oxide represented by general formula $ABO_3$ and formed by firing a raw material mixture at a high temperature of 1000° C. or more is used at a reaction temperature of 400° C. to 900° C., and the like.

Further, there have been proposed a method (Patent Literature 4) in which a catalyst containing an iron-group metal as an active metal and prepared by supporting an iron-group metal compound on at least one metal oxide selected from the group consisting of ceria, zirconia, yttria, lanthanum oxide, alumina, magnesia, tungsten oxide, and titania and then reducing the compound is used at a reaction temperature of 180° C. to 950° C., a method (Patent Literature 5) in which a catalyst prepared by supporting at least one metal element belonging to the group VIII to group X in the long-period periodic table on a support composed of a composite oxide containing ceria, alumina, and if required, zirconia, is used at a reaction temperature of 150° C. to 650° C., a method (Non-Patent Literature 1) in which a catalyst prepared by compounding a metallic component of Ni, Cu, or Zn with alumina cement composed of calcia and alumina, and the like. However, in the catalyst of this method, Ni easily reacts with alumina to produce a $NiO—Al_2O_3$ solid solution, thereby failing to produce a mayenite-type structure.

A hydrogen generating apparatus in which hydrogen produced by decomposing liquid ammonia is supplied to a fuel cell preferably uses a hydrogen producing catalyst capable of producing high-purity hydrogen with a high conversion rate at as a low reaction temperature as possible. Patent Literature 6 discloses that a noble metal catalyst such as Pt, Rh, Pd, Ru, or the like is preferred as a hydrogen producing catalyst exhibiting stable performance for ammonia decomposition reaction for fuel cell vehicles in which initiation or termination of reaction is repeated.

Also, Patent Literature 7 discloses that a Ni-based hydrogen producing catalyst is a preferred catalyst but requires a longer contact time for achieving the same conversion efficiency as a Ru-based catalyst, and the contact time of the Ru-based catalyst is ⅒ of that of the Ni-based catalyst. It is also disclosed that other preferred ammonia decomposition catalysts include Fe, Rh, Ir, Pd, Pt, and Re catalysts, and compounds containing such an element.

Patent Literature 8 discloses that an ammonia decomposition catalyst including a Na metal, K metal, Na compound, or K compound present on the surfaces of composite oxide particles containing La, Ni, Co, and Fe is suitable as a catalyst for efficiently producing hydrogen and nitrogen from ammonia with a high conversion rate.

On the other hand, there is a substance called the mineral name "mayenite" as calcium aluminosilicate containing CaO, $Al_2O_3$, and $SiO_2$ as constituent components, and compounds having the same type crystal structure as the crystal of mayenite is referred to as "mayenite-type compounds". It is reported that the mayenite-type compounds have a typical composition of $12CaO.7Al_2O_3$ (referred to as "C12A7" hereinafter), and C12A7 crystals have a peculiar crystal structure (space group I4-3d) in which among the 66 oxygen ions present in a unit cell containing 2 molecules, 2 oxygen ions are included as "free oxygen" in the space of a cage formed by a crystal skeleton (chemical formula $[Ca_{24}Al_{28}O_{64}]^{4+}(O^{2-})_2$ (referred to as "C12A7:O" hereinafter) (Non-Patent Literature 2).

In the mayenite-type compounds, Ca constituting the formula of the typical composition may be partially or entirely substituted by at least one typical metal element or transition metal element selected from the group consisting of Li, Na, K, Mg, Sr, Ba, Sc, Ti, V, Cr, Mn, Fe, Co, Ni, Cu, Ir, Ru, Rh, and Pt. Also, Al constituting the formula of the typical composition may be partially or entirely substituted by at least one typical metal element or transition metal element selected from the group consisting of B, Ga, C, Si, Fe, and Ge. Further, O constituting the formula of the typical composition may be partially or entirely substituted by at least one typical element or metal element selected from the group consisting of H, F, Cl, Br, and Au.

In and after 2003, the inventors of the present invention have made it clear that the free oxygen ions can be substituted by various anions. In particular, when C12A7 is held in a strong reducing atmosphere, all free oxygen ions can be substituted by electrons. C12A7 in which free oxygen ions are substituted by electrons can be represented by the chemical formula $[Ca_{24}Al_{28}O_{64}]^{4+}(e^-)_4$ (may be referred to as "C12A7:$e^-$" hereinafter).

Therefore, a substance in which anions are substituted by electrons is called "electride" and the electride has the characteristic of exhibiting good electron conductive properties (Non-Patent Literature 3 and Patent Literature 9). Also, electrons in the cage have the property of readily reacting with hydrogen in a gas phase and being taken as hydrogen anions (hydride) in C12A7 (Non-Patent Literature 4). When C12A7 is reduced with a reducing agent such as Ca, $Ca(OH)_2$, $CaH_2$, or the like, C12A7 including hydrogen anions can be easily synthesized (Non-Patent Literature 5). The C12A7 including hydrogen anions releases hydrogen and returns to electride by light irradiation, heating, or the like (Non-Patent Literature 4).

Although mayenite-type compounds containing hydrogen anions ($H^-$, $H_2^-$) at a concentration of $1\times10^{18}$ $cm^{-3}$ or more and a method for producing the compounds are reported (Patent Literatures 10 to 12 and Non-Patent Literature 5), examples of application of hydrogen anion-including C12A7 are little known.

The inventors filed applications for patent for an invention (Patent Literature 13) relating to a catalyst for ammonia synthesis reaction, the catalyst containing a conductive mayenite-type compound and a metal, such as Ru, Fe, or the like, supported on the compound, and a method for synthesizing ammonia using the catalyst under the conditions of a reaction temperature of room temperature to 600° C. or less and a reaction pressure of 10 kPa to 20 MPa, and an invention (Patent Literature 14) relating to a method for reducing carbon dioxide to carbon monoxide by using a conductive mayenite-type compound.

Even when C12A7 has no conductivity, it has application as a catalyst and a catalyst support and, for example, a catalyst produced by spray-drying a solution of a raw material complex and then calcining at 1300° C. to 1400° C. for 2 hours or more is known to be used as a catalyst for steam decomposition reaction for producing soft olefins (Patent Literature 15). In recent years, a method for producing a C12A7 powder with a high specific surface area has been proposed, in which a precursor is synthesized by a hydrothermal method or a sol-gel method and is then fired (Non-Patent Literatures 6 and 7).

CITATION LIST

Patent Literature

PTL 1: Japanese Unexamined Patent Application Publication No. 01-119341

PTL 2: Japanese Unexamined Patent Application Publication No. 08-084910 (Japanese Patent No. 3688314)

PTL 3: Japanese Unexamined Patent Application Publication No. 2010-110697

PTL 4: Japanese Unexamined Patent Application Publication No. 2010-094668

PTL 5: Japanese Unexamined Patent Application Publication No. 2010-207783

PTL 6: Japanese Unexamined Patent Application Publication No. 2003-040602

PTL 7: Japanese Unexamined Patent Application Publication (Translation of PCT Application) No. 2008-536795 (Japanese Patent No. 4990267)

PTL 8: Japanese Unexamined Patent Application Publication No. 2012-161713

PTL 9: WO2005/000741

PTL 10: WO2003/089373

PTL 11: Japanese Unexamined Patent Application Publication No. 2012-101945

PTL 12: WO2008/087774

PTL 13: WO2012/077658

PTL 14: Japanese Unexamined Patent Application Publication No. 2012-025636

PTL 15: U.S. Pat. No. 6,696,614 specification Non-Patent Literature

NPL 1: V. I. Yakerso and E. Z. Golosman, "Studies in surface science and catalysis", 91, 879 (1995)

NPL 2: Von Hans Bartl and Thomas Scheller, "N. Jahrbuch F. Mineralogie. Monatshefte" 35, 547-552, (1970)

NPL 3: S. Matsuishi, Y. Toda, M. Miyakawa, K. Hayashi, T. Kamiya, M. Hirano, I. Tanaka and H. Hosono, "Science", 301, 626-629, (2003)

NPL 4: K. Hayashi, P. V. Sushko, A. L. Shluger, M. Hirano, and H. Hosono "Journal of Physical Chemistry B", 109, 23886-23842, (2005)

NPL 5: K. Hayashi, "Journal of Solid State Chemistry", 184, 1428-1432, (2011)

NPL 6: L. Gong, Z. Lin, S. Ning, J. Sun, J. Shen, Y. Torimoto and Q. Li, "Material Letters", 64, 1322-1324, (2010)

NPL 7: C. Li, D. Hirabayashi and K. Suzuki, "Materials Research Bulletin", 46, 1307-1310, (2011)

SUMMARY OF INVENTION

Technical Problem

Exhaust gas from a semiconductor manufacturing apparatus, a LCD manufacturing apparatus, and the like contains high concentration of ammonia. Also, air in the vicinities of toilets and the like contains ammonia at a volume fraction of as low as about several to several tens ppm. Therefore, there is demand for an ammonia decomposition catalyst for highly efficient application to ammonia at a high concentration to a low concentration in exhaust gas and environments.

Further, there are proposed a method in which hydrogen produced by decomposing ammonia produced from organic waste is used as an energy source, and a method in which hydrogen produced by storing hydrogen as liquid ammonia in a cylinder or the like and decomposing vaporized ammonia gas is used for fuel cells. In the case of use of hydrogen produced by decomposing ammonia, the produced gas is required to contain small amounts of impurities. In particular, when hydrogen is produced, as a raw material for automobile fuel cells, from liquid ammonia, a hydrogen producing catalyst for converting ammonia to hydrogen with high efficiency at a relatively low temperature and a high space velocity is required for the problem of heat resistance of an apparatus and the production of high-purity hydrogen by decreasing ammonia remaining in $H_2/N_2$ products.

Heat-resistant ceramics having a melting point of about 2000° C. or more, such as alumina, zirconia, magnesia, titania, and the like, have been used as a support for an ammonia decomposition catalyst. However, there is the problem of decreasing catalytic activity due to aggregation of a support and supported metals in decomposition reaction in a high-temperature environment of 800° C. or more. Also, in the case of a high concentration of ammonia raw material, decomposition reaction at a relatively low temperature has the problem of a low rate of $NH_3$ conversion.

An object of the present invention is to provide a supported metal catalyst advantageous in view of resources and having high performance and low cost as a hydrogen producing catalyst for decomposing ammonia into hydrogen and nitrogen, and provide a method for producing hydrogen by efficient decomposition of ammonia using the supported metal catalyst.

Solution to Problem

As a result of earnest research for achieving the object, the inventors found that a supported metal catalyst including a base material which is used as a support for an ammonia decomposition catalyst and which is composed of a mayenite-type compound containing oxygen ions or $10^{15}$ cm$^{-3}$ or more of conduction electrons or hydrogen anions has a high efficiency of ammonia decomposition and, for example, a $NH_3$ conversion ratio of 2 times the case of an alumina support can be achieved.

According to the present invention, ammonia with a low volume fraction of 0.1% to a high volume fraction of 20% or more and 100% can be decomposed with a high conversion rate by using a hydrogen producing catalyst for producing hydrogen by contact decomposition of ammonia gas even at a relatively low decomposition reaction temperature. The type of balance gas is not particularly limited, and inert gas such as nitrogen, He, or Ar, and oxygen or reducing gas which does not influence on the decomposition reaction may be contained as the balance gas.

The present invention relates to a catalyst for producing hydrogen by contact decomposition of ammonia gas, the catalyst including, as a base material, a powder or molded compact of a mayenite-type compound which contains oxygen ions or $10^{15}$ cm$^{-3}$ or more of conduction electrons or hydrogen anions, and catalytic metal particles for ammonia decomposition which adhere to a surface of the base material, and the present invention also relates to a method for producing hydrogen by ammonia decomposition reaction using the catalyst.

A mayenite compound represented by C12A7 and containing oxygen ions or less than $10^{15}$ cm$^{-3}$ of conduction electrons or hydrogen anions has high decomposition activity, and a mayenite compound containing a larger amount of conduction electrons or hydrogen anions has a higher efficiency of ammonia decomposition. Further, the mayenite compound in the supported metal catalyst of the present invention contains $10^{15}$ cm$^{-3}$ or more, more preferably $10^{17}$ cm$^{-3}$ or more, of conduction electrons or hydrogen anions, and still more preferably contains $10^{18}$ cm$^{-3}$ or more, of conduction electrons or hydrogen anions. The mayenite-type compound can be produced by the known methods described in "Background Art", and the compounds produced by the methods can be properly used in the present invention.

A catalytically active metal in the hydrogen-producing catalyst of the present invention is at least one selected from the metal elements of Groups VIII, IX, and X in the long-period periodic table. A catalyst used in usual ammonia decomposition reaction and including a catalytically active metal supported on a support such as an oxide or the like is generally once subjected to reduction with hydrogen and then used in ammonia decomposition reaction. Similarly, the hydrogen-producing catalyst of the present invention is also preferably subjected to reduction before use, but electrons in cages of the mayenite compound may be allowed to react with hydrogen and included as hydrogen anions (hydride) in the reduction process.

Transition metal elements are used as homogeneous or heterogeneous catalyst components for various catalytic reactions. The transition metals of Group VI, VIII, or IX, such as Fe, Ru, Os, Co, Mo, and the like, are generally known to be suitable as catalysts for synthesizing ammonia by direct reaction of hydrogen with nitrogen. Also, the transition metals of Groups VIII and X, such as Ru, Ni, and the like, are reported to exhibit activity for ammonia decomposition. Although researchers receive that a rate-controlling stage of ammonia synthesis is dissociation of nitrogen molecules having a triple bond, it is reported that rate-controlling processes of decomposition are a process of cutting a N—H bond and a process of recombining N atoms. Therefore, both reactions are in a relation of forward-backward reaction but have completely different rate-controlling stages. Therefore, it cannot be easily determined whether or not a mayenite-type compound supported catalyst is effective as a catalyst for producing hydrogen by contact decomposition of ammonia gas.

A support powder or compact including catalytically active metal particles adhering to and supported on a surface of a conductive mayenite-type compound as a base material includes the same degree of electrons as the initial degree after a supporting step and has a high electron-donating ability to the catalytically active metal particles because of its small work function as a support. The same can be expected from hydrogen anions.

Although the mechanism by which the hydrogen-producing catalyst of the present invention exhibits a high conversion rate is not clarified, the currently conceivable factor that provides high activity is (1) that electrons or hydrogen anions in cages provide a change in the electron state of the active metal particles such as Ru or the like and promote activation of ammonia or (2) that the cages holding electrons or hydrogen anions function as a storage house for reaction intermediates (for example, $NH_2^-$ and $H^-$) and prevent poisoning of active sites of Ru or the like. It is understood that the ammonia decomposition rate is improved by the two functions of donating ability and storage ability of the electrons or hydrogen anions. The base material having such a peculiar function is considered to be beyond the concept of a usual support.

The supported metal catalyst can be produced by, for example, a method such as an impregnation method, a physical mixing method, a thermal decomposition method, a liquid phase method, a vapor deposition method, or the like. First, a compound of the catalytically active metal as a metal component material is supported on or mixed with the mayenite-type compound base material by any one of these methods to prepare a catalyst precursor. Next, the resultant precursor is heated in a reducing atmosphere to reduce the compound of the catalytically active metal to catalytically active metal particles and adhere the metal particles to a surface of the base material. The catalytically active metal particles may be formed directly on a surface of the base material by a sputtering method.

The impregnation method includes a step of dispersing or immersing a powder or compact of the mayenite-type compound as the base material in a solvent solution of the compound of the catalytically active metal, a step of evaporating a solvent of the solvent solution to dry the compound of the catalytically active metal and form the catalyst powder composed of the compound on a surface of the base material, and a step of reducing the compound of the catalytically active metal by heating in a reducing atmosphere to allow particles of the catalytically active metal to adhere to the surface of the base material.

Hydrogen can be produced with a high $NH_3$ conversion rate by continuously supplying ammonia gas with a volume fraction of 0.1 to 100% to a catalyst layer, which is formed by filling a reactor with the supported metal catalyst, and performing contact decomposition reaction at a reaction pressure of 0.01 MPa to 1.0 MPa, a reaction temperature of 300° C. to 800° C., and a weight hourly space velocity (WHSV) of $500/mlg^{-1}h^{-1}$ or more.

A typical composition of the mayenite-type compound containing conduction electrons is represented by the formula $[Ca_{24}Al_{28}O_{64}]^{4+}(O^{2-})_{2-x}(e^-)_{2x}$ ($0 < x \leq 2$). The mayenite-type compound containing conduction electrons contains, as the conduction electrons, electrons which are substituted for oxide ions ($O_2^-$ and $O_2^{2-}$) included in a structure, and C12A7 is represented by the composition formula $([Ca_{24}Al_{28}O_{64}]^{4+}(O^{2-})_{2-x}(e^-)_{2x}$ ($0 < x \leq 2$). Further substitution of the oxide ions with electrons causes a conduction electron concentration of $1 \times 10^{15}$ $cm^{-3}$ or more. Therefore, the mayenite-type compound containing conduction electrons can be referred to as a "conductive mayenite-type compound". The theoretical maximum concentration of conduction electrons in C12A7:$e^-$ is $2.3 \times 10^{21}$ $cm^{-3}$. The composition of C12A7 including hydrogen anions is represented by the formula $[Ca_{24}Al_{28}O_{64}]^{4+}(O^{2-})_{2-x}(H^-)_{2x}$ ($0 < x \leq 2$).

C12A7 produces light absorption at 2.8 eV and 0.4 eV. The electron concentration can be determined by measuring a coefficient of the light absorption. When a sample is a powder, the electron concentration can be simply determined by a diffuse reflection method. Also, electrons in cages have spin activity, and thus the electron concentration in cages can be measured by using electron spin resonance (ESR). Further, C12A7 including conduction electrons is capable of reducing iodine molecules, and thus the electron concentration in cages can be measured by iodometry. The concentration of hydrogen anions can be determined by a solid-state nuclear magnetic resonance spectroscopy of hydrogen nuclei ($^1H$ NMR).

Advantageous Effects of Invention

An ammonia decomposition method using the hydrogen-producing catalyst of the present invention permits ammonia contact decomposition even under mild conditions of 350° C. and 0.1 MPa and at a high weight hourly space velocity (WHSV) using, as a base material, a mayenite-type compound which is composed of only elements with a high Clarke number, such as calcium, aluminum, and oxygen, and which is an easily synthesizable, low-cost, and nontoxic compound. Also, the method can produce high-purity hydrogen by decomposition with a high conversion rate using a transition metal element, for example, Co, Ni, or the like, other than expensive rare metals such as Ru, and is advantageous from the viewpoint of effective utilization of resources. In addition, unlike a usual alumina-supported catalyst, an alkali metal or alkaline-earth metal compound or the like need not be added as an accelerator for improving the conversion rate, thereby simplifying a process for producing a supported metal catalyst.

DESCRIPTION OF EMBODIMENTS

The structure of a hydrogen-producing catalyst of the present invention, a method for producing the catalyst, and a method for producing hydrogen by ammonia decomposition using the catalyst are described in detail below.

<Production of Mayenite-Type Compound Base Material>

C12A7 which is a typical composition of a mayenite-type compound is described in detail below, but the present invention is not limited to C12A7 and can be applied to all mayenite-type compounds having the same crystal structure as C12A7, such as $12SrO \cdot 7Al_2O_3$ or the like in which Ca is substituted with Sr. A base material composed of C12A7 and used as a starting material of a method of producing a catalyst of the present invention may be a powder or a compact such as a porous body, a solid sintered body, a thin film, a solid single crystal, or the like, and the compact may have any shape. In addition, C12A7 supported on a support composed of another material may be used as the base material. The base material functions as a support for catalytically active metal particles.

A raw material of C12A7 is synthesized by a solid-phase method, a hydrothermal method, or the like. Hydrothermal reaction is a reaction involving water at a high temperature and high pressure of 100° C. or more and 5 MPa or more, and a ceramic powder can be synthesized by reaction at a low temperature within a short time. By using a hydrothermal synthesis method, a C12A7 powder with a large specific surface area (about 20 to 60 $m^2g^{-1}$) can be produced. For example, $Ca_3Al_2(OH)_{12}$ which is a hydroxide used as a precursor of C12A7 can be produced by mixing water, calcium hydroxide, and aluminum hydroxide with a stoichiometric composition, and then heating the resultant mixture, for example, at 150° C. for about 6 hours. The adsorbed water, surface hydroxyl groups, $OH^-$ in the cages, etc. can be removed by vacuum evacuation treatment of the powder at 750° C. to 900° C., thereby preventing deactivation of a reducing agent in the step of injecting electrons.

<Step of Including Conduction Electrons or Hydrogen Anions in C12A7 Base Material>

In producing a C12A7 powder including conduction electrons, a raw material powder of C12A7 with the stoichiometric composition may be heated in a reducing atmosphere. For a porous body or solid sintered body of C12A7 including conduction electrons, a raw material powder of C12A7 with the stoichiometric composition may be molded and then heated with Ca, $CaH_2$, or the like in a reducing atmosphere. The C12A7 base material including conduction electrons other than a thin film and a solid single crystal can be produced directly from a raw material without passing through the production of a C12A7 base material not containing conduction electrons. Similarly, a powder, a porous body, or a solid sintered body of the the C12A7 base material containing hydrogen anions can also be synthesized by heating in a hydrogen stream or heating with Ca or the like in a reducing atmosphere.

A thin film of C12A7 containing conduction electrons can be produced by forming a thin film of C12A7 on a substrate of MgO, $Y_3Al_5O_{12}$, or the like by a pulsed laser deposition (PLD) method, a sputtering method, a plasma spraying method, or the like using a C12A7 solid sintered body as a target and again depositing a C12A7 thin film by the PLD method under heating at 500° C. or more to integrate these thin films. In the second PLD method, plasmanized C12A7 functions as a reducing agent, and thus conduction electrons are included in the thin film. A thin film of C12A7 containing hydrogen anions can also be synthesized by the same method.

A solid single crystal of C12A7 containing conduction electrons may be produced by pulling up a melt (CZ method) prepared by melting a C12A7 raw material powder at about 1600° C. to form a C12A7 single crystal, sealing the single crystal in a vacuum glass tube together with a metal Ca powder or Ti powder, or the like, and heating the single crystal in a reducing atmosphere to include conduction electrons into the solid single crystal. A solid single crystal of C12A7 including hydrogen anions can also be synthesized by the same method.

The solid sintered body or soil single crystal of C12A7 including conduction electrons or hydrogen anions can be processed into a powder. Processing into a powder can be performed by grinding in a mortar, grinding by a jet mill, or the like. The size of the powder is not particularly limited, but particles having a distribution of particle diameters in a range of about 100 nm to 1 mm can be produced by the this method. In addition, C12A7 including $1 \times 10^{15}$ $cm^{-3}$ or more of conduction electrons or hydrogen anions can be produced by the method.

Regardless of a power, a porous body, a solid sintered body, a thin film, and a solid single crystal, conduction electrons may be removed from a surface portion of the base material according to the production method. In this case, it is preferred to include $1 \times 10^{15}$ $cm^{-3}$ or more of conduction electrons up to the uppermost surface of the base material by heating at 500° C. or more to less than the melting point (1250° C.) of the compound in vacuum, inert gas, or a reducing atmosphere.

<Step of Supporting Active Metal Component>

The ammonia decomposition of the present invention can be performed by using as the catalytically active metal a transition metal element selected from the Group VIII, Group IX, or Group X in the long-period periodic table. However, a Group VIII element selected from Fe, Ru, and Os, a Group IX element selected from Co, Rh, and Ir, and a Group X element selected from Ni, Pd, and Pt are particularly preferably used alone or in combination.

When the C12A7 powder or porous body is used as the base material, the $C12A7:e^{-1}$ powder or porous body containing $1 \times 10^{15}$ $cm^{-3}$ or more of conduction electrons produced in the above-described steps is mixed with a compound of the catalytically active metal by any one of various methods, for example, a CVD method (chemical vapor deposition method) and an impregnation method. When the solid sintered body, the thin film, the solid single crystal, or the like is used, like the powder or porous body, a compound of the catalytically active metal is deposited on the surface of the base material by the impregnation method, the CVD method, or the sputtering method, and the compound of the catalytically active metal is thermally decomposed in a reducing atmosphere, preferably, at a temperature of 150° C. to 800° C. to deposit and adhere the catalytically active metal to the surface of the base material. When the compound of the catalytically active metal is used, for example, a method can be used, in which each of the metal raw materials is deposited on C12A7 by the CVD method or the like, thermally decomposed, and then nitrided with ammonia gas.

Examples of the compound of the catalytically active metal include, but are not particularly limited to, easily thermally decomposable inorganic metal compounds or organic metal complexes, such as triruthenium dodecacarbonyl $[Ru_3(CO)_{12}]$, dichlorotetrakis(triphenylphosphine) ruthenium(II) $[RuCl_2(PPh_3)_4]$, dichlorotris(triphenylphosphine) ruthenium(II) $[RuCl_2(PPh_3)_3]$, tris(acetylacetonate) ruthenium(III) $[Ru(acac)_3]$, ruthenocene $[Ru(C_5H_5)]$, ruthenium chloride $[RuCl_3]$, pentacarbonyl iron $[Fe(CO)_5]$, tetracarbonyl iron iodide $[Fe(CO)_4I_2]$, iron chloride $[FeCl_3]$, ferrocene $[Fe(C_5H_5)_2]$, tris(acetylacetonate) iron(III) $[Fe(acac)_3]$, dodecacarbonyl triiron $[Fe_3(CO)_{12}]$, cobalt chloride $[CoCl_3]$, tris(acetylacetonate) cobalt(III) $[Co(acac)_3]$, cobalt(II) acetylacetonate $[Co(acac)_2]$, cobaltoctacarbonyl $[Co_2(CO)_3]$, cobaltocene $[Co(C_5H_5)_2]$, triosmium dodecacarbonyl $[Os_3(CO)_{12}]$, acetylacetonate nickel (II) dihydrate $[C_{10}H_{14}NiO_4 \cdot xH_2O]$, and the like.

The impregnation method can use the following steps. For example, a support powder is dispersed in a solution of the compound of the catalytically active metal (for example, a hexane solution of Ru carbonyl complex) and the resultant dispersion is stirred. In this case, the amount of the compound of the catalytically active metal is 0.01 to 40 wt %, preferably 0.02 to 30 wt %, and more preferably 0.05 to 20 wt % relative to the support powder. Then, the solvent is evaporated to dryness by heating in an inert gas stream, such as nitrogen, argon, helium, or the like, or under vacuum at 50° C. to 200° C. for 30 minutes to 5 hours. Next, a catalyst precursor composed of the dried compound of the catalytically active metal is reduced. These steps can yield a supported metal catalyst in which the catalytically active metal is highly dispersed as fine particles having a diameter of several nm to several hundred nm and strongly adheres to the surface of the support powder. If required, the catalyst of the present invention may use an accelerator as an additive.

The supported metal catalyst including the $12CaO \cdot 7Al_2O_3$ powder as a support has a BET specific surface area of about 1 to 100 $m^2 g^{-1}$, and the amount of the catalytically active metal is 0.01 to 30 wt %, preferably 0.02 to 20 wt %, and more preferably 0.05 to 10 wt % relative to the support powder. The amount of less than 0.01 wt % is ineffective because of an excessively small number of active points, and the amount of over 30 wt % is undesired for cost because of little increase in catalytic activity.

Instead of the method described above, a supported metal catalyst having the same form as described above can be produced by mixing, in a solid phase, a C12A7 powder containing $1 \times 10^{15}$ cm$^{-3}$ or more of conduction electrons and a compound powder of the catalytically active metal by a physical mixing method under the same conditions as described above, and then reducing the mixture by heating.

Also, the supported metal catalyst can be used as a compact by using a general molding technique. Examples of a shape include a granular shape, a spherical shape, a tablet shape, a ring shape, a macaroni-like shape, a four-leaf shape, a dice shape, a honeycomb shape, and the like. The support coated with the supported metal catalyst can also be used.

<Decomposition of Ammonia>

Ammonia decomposition is a reaction represented by formula 1 below, in which a reactor is filled with the supported metal catalyst to form a catalyst layer, and ammonia gas as a raw material is continuously supplied at a reaction temperature of 350° C. to 800° C. and is brought into contact with the catalyst layer, thereby producing hydrogen and nitrogen.

$$2NH_3 \rightarrow 3H_2 + N_2 \quad \text{(Formula 1)}$$

The ammonia decomposition reaction is an equilibrium reaction and is also an endothermic reaction and a volume-increasing reaction, and thus high temperature-low pressure conditions are advantageous. When the catalyst of the present invention is used, the reaction pressure is preferably in a range of 0.01 Mpa to 1.0 MPa, and the temperature is preferably in a range of 300° C. to 800° C. The reaction pressure of less than 0.1 MPa allows the decomposition reaction to efficiency proceeds but is disadvantageous in view of cost because of the need for a pressure deducing equipment. The reaction pressure of 0.10 MPa (atmospheric pressure) is preferred in view of equipment. On the other hand, the reaction pressure over 1.0 MPa causes an equilibrium advantageous to the raw material side and thus cannot exhibit a satisfactory decomposition rate. The reaction temperature of less than 300° C. is unpractical because of a low reaction rate. On the other hand, the temperature over 800° C. causes a high decomposition rate but is undesired because of the need for an expensive heat-resistant apparatus and the influence on the catalyst life. The reaction temperature is more preferably 400° C. to 750° C., and the temperature for a Ru catalyst is more preferably 400° C. to 600° C., and the temperature for a Ni or Co catalyst is more preferably 500° C. to 750° C. The C12A7 has a melting point of 1250° C. and is not sintered at about 800° C.

The method of the present invention can use, as the raw material, either ammonia gas diluted with a balance gas or ammonia alone, that is, ammonia gas with a volume fraction of 0.1% to 100% can be used. When hydrogen is produced by ammonia decomposition reaction, it is necessary to separate between the produced hydrogen and nitrogen, and thus the volume fraction of ammonia is preferably as high as possible. The suitable volume fraction is 5% or more, preferably 20% or more, and more preferably 70% or more. The decomposition reaction at a weight hourly space velocity (WHSV) of 500 mlg$^{-1}$h$^{-1}$ or more can exhibit a high NH$_3$ conversion rate.

The gas produced by the ammonia decomposition method of the present invention theoretically contains hydrogen and nitrogen at a molar ratio of 3:1, and can be used as gas, for example, for bright annealing finish of stainless steel, nickel steel, nickel, nickel-copper or nickel-chromium alloy, or the like. Further, hydrogen produced in the present invention do not contain CO and CO$_2$ which are harmful to fuel cells, and thus the produced hydrogen separated from nitrogen and purified can be used as, for example, hydrogen for fuel cells.

The ammonia decomposition reaction can be performed by using a general gas-solid phase contact reaction apparatus using a corrosion-resistant material such as stainless steel or the like. The reaction system may be any one of a batch reaction system, a closed circulating reaction system, and a flow reaction system, but the flow reaction system is most preferred from a practical viewpoint. Since the reaction is an endothermic reaction, it is advantageous to perform the reaction while supplying reaction heat, and various industrial designs for supplying reaction heat are considered for increasing the yield. For example, a method is proposed, in which ammonia decomposition reaction is performed while combustion heat is obtained by oxidizing a portion of an ammonia raw material with air.

In the present invention, like in a usual method, the ammonia decomposition reaction can be performed by using a single reactor filled with the catalyst or a plurality of reactors. Also, any one of a method of connecting a plurality of reactors and a method of using a reactor including a plurality of reaction layers formed therein can be used. The catalyst used may be any one of the catalyst of the present invention alone, a combination of two or more catalysts selected from the catalysts of the present invention, or a combination of the catalyst of the present invention and a known catalyst. In view of improvement in conversion rate, the catalytic metal is preferably activated by exposing the catalyst to a reducing gas atmosphere of hydrogen or the like at 300° C. to 700° C. for about 30 minutes to 2 hours before the ammonia decomposition reaction.

The present invention is described in further detail below based on examples. An atmospheric pressure fixed-bed flow reactor (FIG. 1) was used, and an ammonia decomposition rate was determined by gas-chromatographic quantitative determination of an amount of NH$_3$ produced to evaluate ammonia decomposition activity. The conversion rate a (%) was determined according to a formula below. In the formula, P$_{NH3}$ and P'$_{NH3}$ represent ammonia partial pressures before and after the reaction, respectively.

Figure 1:
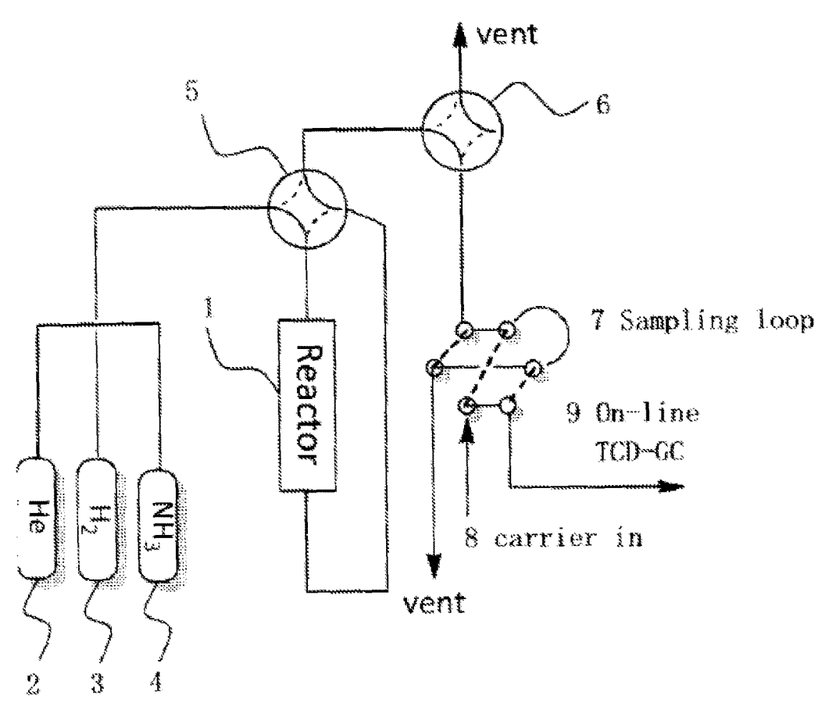
FIG. 1 is a schematic drawing of a reaction line used for $NH_3$ decomposition shown in Examples 1 to 8 and Comparative Examples 1 and 2.

NH$_3$ conversion rate: a (%)=100P$_{NH3}$(P$_{NH3}$−P'$_{NH3}$)/ (P$_{NH3}$+P'$_{NH3}$)

FIG. 1 shows the outlines of an apparatus used in experiments. A quartz reactor 1 (inner diameter: 6 mm, length: 24 cm, inner volume: 6.8 ml) was filled with a supported metal catalyst prepared in each of examples and comparative examples described below. Then, the supported metal catalyst was previously reduced by flowing H$_2$ to the reactor 1 from a cylinder 3. Then, NH$_3$ was flowed to the reactor 1 from a cylinder 4. When H$_2$ was diluted, a predetermined amount of He was supplied from a cylinder 2 and mixed with H$_2$. The ammonia flow rate was controlled by a ball flow meter 5 so as to be a predetermined weight hourly space velocity. Then, the reaction system was heated to a predetermined temperature, and an activity test was conducted. The reaction product flowing out from the reactor 1 was discharged through an exhaust port 6 (vent), and a part of the product was collected in a measuring tube 7 (Sampling loop) and analyzed by a gas chromatograph 9 (On-line TCD-GC) with a thermal conductive detector to which a carrier gas was supplied from a carrier gas inlet 8 (carrier in) of the gas chromatograph.

EXAMPLE 1

<Preparation of C12A7 Base Material Containing Oxygen Ions>

Powders of $Ca(OH)_2$ (Shuzui Hikotaro Shoten, 23.1 g) and $Al(OH)_3$ (Kojundo Chemical Laboratory Co., Ltd., 28.4 g) were mixed so that a Ca/Al molar ratio was 12:14, and 449 ml of water was added to the resultant mixture, followed by hydrothermal treatment in an autoclave at 150° C. over 5 hours. The resultant powder was filtered, washed with 500 ml of water, dried at 150° C., fired in an oxygen stream at 800° C. for 2 hours, and then ground to prepare a C12A7 (referred to as "C12A7:O" hereinafter) powder having a specific surface area of 40 $m^2g^{-1}$ and a particle diameter of 0.1 mm to 0.5 mm and containing oxygen ions but not containing conduction electrons and hydrogen anions.

<Preparation of C12A7 Base Material Containing Conduction Electrons>

The C12A7:O powder prepared by the method described above was inserted into a silica glass tube and pre-treated by vacuum-heating at 800° C. for 15 hours in a vacuum of $1 \times 10^{-4}$ Pa. Then, 2.5 g of the resultant powder was inserted, together with 0.1 g of a Ca metal powder, in a silica glass tube and heated at 700° C. for 15 hours to prepare a $C12A7:e^-$ (hereinafter referred to as "C12A7:e") powder having a conduction electron concentration of $1.5 \times 10^{21}$ $cm^{-3}$. The prepared powder had a smaller specific surface area of 14 $m^2g^{-1}$ (particle diameter: 0.2 mm to 1 mm).

<Preparation of C12A7 Base Material Containing Hydrogen Anions>

The C12A7:O powder prepared by the method described above was inserted into a silica glass tube and pre-treated by vacuum-heating at 750° C. for 15 hours in a vacuum of $1 \times 10^{-4}$ Pa. Then, 1.5 g of the resultant powder was inserted, together with 45 mg of a Ca metal powder, in a silica glass tube and heated at 700° C. for 15 hours to prepare a $C12A7:H^-$ (hereinafter referred to as "C12A7:H") powder having a hydrogen anion concentration of $2.5 \times 10^{20}$ $cm^{-3}$. Inclusion of hydrogen anions was confirmed by $^1H$ NMR and iodometry. The prepared powder had a smaller specific surface area of 16 $m^2g^{-1}$ (particle diameter: 0.2 mm to 1 mm).

<Supporting of Ru on Support Powder>

First, 1 g of the resultant C12A7:e powder was inserted, together with 45 mg of $Ru_3(CO)_{12}$, in a silica glass tube, and then $Ru_3(CO)_{12}$ was reduced by heating at 400° C. for 2 hours to adhere Ru particles to the surface of the C12A7:e powder by chemical vapor deposition. As a result, a supported metal catalyst (2 wt % Ru/C12A7:e) including an electride powder on which 2% by weight of Ru metal was supported was produced. The specific surface area was measured by a fully automatic BET surface area measurement device. The particle diameter was determined from the results of measurement of CO dispersibility. The Ru metal after hydrogen reduction had a particle diameter of 15 nm, and the dispersibility determined based on CO adsorption was 8.6%.

<Ammonia Decomposition Reaction>

A quartz reaction tube was packed with 60 to 100 mg of the Ru-supported catalyst produced by the method described above to form a catalyst layer, and ammonia decomposition reaction was carried out by using an ammonia decomposition apparatus shown in FIG. 1. Before the decomposition reaction, Ru was activated by reducing the Ru-supported catalyst in a hydrogen steam for 2 hours in the quartz reaction tube heated to 400° C. to 450° C. Then, the temperature in the quartz reaction tube was adjusted to 350° C. to 700° C., and ammonia gas with an ammonia volume fraction of 100% was flowed through the catalyst layer at 5 to 100 $ml \cdot min^{-1}$. The reaction results are shown in Table 1. The $NH_3$ conversion rates at 350° C., 440° C., and 700° C. are 51.9%, 79.8%, and 99.8%, respectively, and the $NH_3$ decomposition rates at 350° C., 440° C., and 700° C. are 1.11, 8.2, and 82.3 ($kg_{NH_3}kg_{cat}^{-1}h^{-1}$), respectively. The weight hourly space velocities are 3000, 15000, and 120000 $mlg^{-1}h^{-1}$, respectively.

EXAMPLE 2

A 5 wt % Ru/C12A7:e powder was prepared by the same method as in Example 1 except that the amount of Ru supported was 5 wt %, and ammonia decomposition reaction was carried out. The results are shown in Table 1. The $NH_3$ conversion rate at 440° C. was 67.2%, and the $NH_3$ decomposition rate at 440° C. was 6.9 ($kg_{NH_3}kg_{cat}^{-1}h^{-1}$).

EXAMPLE 3

A 2 wt % Ru/C12A7:H powder was prepared by the same method as in Example 1 except that C12A7:H was used as a support, and ammonia decomposition reaction was carried out. The results are shown in Table 1. The $NH_3$ conversion rate at 440° C. was 76.5%, and the $NH_3$ decomposition rate at 440° C. was 7.9 ($kg_{NH_3}kg_{cat}^{-1}h^{-1}$).

EXAMPLE 4

The same catalyst as tested in Example 1 was used and tested at an ammonia volume fraction ($V_{NH_3}$) of 1.7% (He balance) and a total gas flow rate of 180 ml/min (WHSV: 216000 $mlg^{-1}h^{-1}$). The results are shown in Table 1. The $NH_3$ conversion rate at 440° C. was 100%, and the $NH_3$ decomposition rate at 440° C. was 2.1 ($kg_{NH_3}kg_{cat}^{-1}h^{-1}$).

EXAMPLE 5

A 2 wt % Ru/C12A7:O powder was prepared by the same method as in Example 1 except that a C12A7:O powder containing oxygen ions but not containing conduction electrons was used instead of the C12A7:e powder, and ammonia decomposition activity was examined. The results are shown in Table 1. The $NH_3$ conversion rate at 440° C. was 54.3%, and the $NH_3$ decomposition rate at 440° C. was 5.6 ($kg_{NH_3}kg_{cat}^{-1}h^{-1}$).

COMPARATIVE EXAMPLE 1

A 2 wt % Ru/CaO powder was prepared by the same method as in Example 1 except that a CaO powder (Kojundo Chemical Laboratory Co., Ltd., particle diameter: 5 mm to 10 mm) was used instead of the C12A7:e powder, and ammonia decomposition activity was examined.

The particle diameter of Ru metal after hydrogen reduction was 4 nm, and dispersibility determined by CO adsorption was 40%. The results are shown in Table 1. The $NH_3$ conversion rate at 440° C. was 42.1%, and the $NH_3$ decomposition rate at 440° C. was 4.3 ($kg_{NH_3}kg_{cat}^{-1}h^{-1}$).

COMPARATIVE EXAMPLE 2

A 6 wt % Ru/γ-$Al_2O_3$ powder was prepared by the same method as in Example 1 except that a γ-$Al_2O_3$ powder (Kojundo Chemical Laboratory Co., Ltd., particle diameter: 0.1 mm to 0.5 mm) was used instead of the C12A7:e powder, and ammonia decomposition activity was examined. The particle diameter of Ru metal after hydrogen reduction was 11 nm, and dispersibility determined by CO adsorption was 13%. The results are shown in Table 1. The $NH_3$ conversion rate at 440° C. was 31.9%, and the $NH_3$ decomposition rate at 440° C. was 3.3 ($kg_{NH3} kg_{cat}^{-1} h^{-1}$).

INDUSTRIAL APPLICABILITY

A contact decomposition method using a hydrogen producing catalyst of the present invention can produce, with a high conversion rate, hydrogen by decomposing ammonia with a low volume fraction to a high volume fraction at about the atmospheric pressure within a wide reaction temperature range of 350° C. to 800° C., and thus the method is considered as a preferred method in view of reduction of energy consumption. Also, hydrogen can be produced by decomposing ammonia with a very high efficiency using inexpensive materials as compared with usual Ru supported catalysts.

TABLE 1

| | Support | $S_{BET}$/ $m^2g^{-1}$ | Electron concentration/ $cm^{-3}$ | H-concentration/ $cm^{-3}$ | Ru amount/ wt % | Temperature/ ° C. | Amount of catalyst/ mg | $NH_3$ flow rate/ $mlmin^{-1}$ | $V_{NH3}$/% | WHSV/ $mlg^{-1}h^{-1}$ | $NH_3$ conversion rate/% | $NH_3$ decomposition rate/ $kgkg^{-1}h^{-1}$ |
|---|---|---|---|---|---|---|---|---|---|---|---|---|
| Example 1 | C12A7:e | 14 | $1.5 \times 10^{21}$ | No | 2 | 350 | 100 | 5 | 100 | 3000 | 51.9 | 1.1 |
| | | 14 | $1.5 \times 10^{21}$ | No | 2 | 440 | 60 | 15 | 100 | 15000 | 79.8 | 8.2 |
| | | 14 | $1.5 \times 10^{21}$ | No | 2 | 700 | 60 | 100 | 100 | 120000 | 99.8 | 82.3 |
| Example 2 | C12A7:e | 14 | $1.5 \times 10^{21}$ | No | 5 | 440 | 60 | 15 | 100 | 15000 | 67.2 | 6.9 |
| Example 3 | C12A7:H | 16 | No | $2.5 \times 10^2$ | 2 | 440 | 60 | 15 | 100 | 15000 | 76.5 | 7.9 |
| Example 4 | C12A7:e | 14 | $1.5 \times 10^{21}$ | No | 2 | 440 | 60 | 3 | 1.7 | 216000 | 100.0 | 2.1 |
| Example 5 | C12A7:O | 40 | No | No | 2 | 440 | 60 | 15 | 100 | 15000 | 54.3 | 5.6 |
| Comparative Example 1 | CaO | 3 | No | No | 2 | 440 | 60 | 15 | 100 | 15000 | 42.1 | 4.3 |
| Comparative Example 2 | Al2O3 | 170 | No | No | 6 | 440 | 60 | 15 | 100 | 15000 | 31.9 | 3.3 |

EXAMPLE 6

A 5 wt % Co/C12A7:e powder was prepared by the same chemical vapor deposition method as for Ru using a C12A7:e powder described in Example 1 and using a $Co_4(CO)_{12}$ raw material instead of $Ru_3(CO)_{12}$. The results are shown in Table 2. The $NH_3$ conversion rate at 600° C. was 54.6%, and the $NH_3$ decomposition rate at 600° C. was 5.6 ($kg_{NH3} kg_{cat}^{-1} h^{-1}$).

EXAMPLE 7

A 5 wt % Co/C12A7:O powder was prepared by the same method as in Example 6 except that a C12A7:O powder containing oxygen ions but not containing conduction electrons was used instead of the C12A7:e powder, and ammonia decomposition activity was examined. The results are shown in Table 2. The $NH_3$ conversion rate at 600° C. was 28.0%, and the $NH_3$ decomposition rate at 600° C. was 2.9 ($kg_{NH3} kg_{cat}^{-1} h^{-1}$).

EXAMPLE 8

A 5 wt % Ni/C12A7:e powder was prepared by the same chemical vapor deposition method as for Ru using a C12A7:e powder described in Example 1 and using acetylacetonate nickel (II) dihydrate $[C_{10}H_{14}NiO_4 \cdot xH_2O]$ instead of $Ru_3(CO)_{12}$, and ammonia decomposition activity was examined. The results are shown in Table 2. The $NH_3$ conversion rate at 600° C. was 86.4%, and the $NH_3$ decomposition rate at 600° C. was 8.9 ($kg_{NH3} kg_{cat}^{-1} h^{-1}$).

The invention claimed is:

1. A method for producing hydrogen comprising:
   continuously supplying an ammonia gas with a volume fraction of 0.1 to 100% to a catalyst layer comprising supported metal catalyst packed in a reactor; and
   performing contact decomposition reaction at a reaction temperature of 350° C. to 800° C.,
   wherein the supported metal catalyst comprises
      a support comprising a mayenite-type compound which includes $10^{15}$ $cm^{-3}$ or more of conduction electrons or hydrogen anions, and
      particles of catalytically active metal for ammonia decomposition which are supported on a surface of the support,
   wherein the contact decomposition reaction is performed at a weight hourly space velocity (WHSV) of 500 /$mlg^{-1}h^{-1}$ or more.

2. The method for producing hydrogen according to claim 1, wherein the contact decomposition reaction is performed at a pressure of 0.01 MPa to 1.0 MPa.

3. The method for producing hydrogen according to claim 1, wherein the catalytically active metal comprises at least one selected from the metal elements of Groups VIII, IX, and X.

TABLE 2

| | Support | $S_{BET}$/ $m^2g^{-1}$ | Electron concentration/ $cm^{-3}$ | H-concentration/ $cm^{-3}$ | Metal | amount/ wt % | Temperature/ ° C. | Amount of catalyst/ mg | $NH_3$ flow rate/ $mlmin^{-1}$ | $P_{NH3}$/% | WHSV/ $mlg^{-1}h^{-1}$ | $NH_3$ conversion rate/% | $NH_3$ decomposition rate/ $kgkg^{-1}h^{-1}$ |
|---|---|---|---|---|---|---|---|---|---|---|---|---|---|
| Example 6 | C12A7:e | 14 | $1.5 \times 10^{21}$ | No | Co | 5 | 600 | 60 | 15 | 100 | 15000 | 54.6 | 5.6 |
| Example 7 | C12A7:O | 40 | No | No | Co | 5 | 600 | 60 | 15 | 100 | 15000 | 28.0 | 2.9 |
| Example 8 | C12A7:e | 14 | $1.5 \times 10^{21}$ | No | Ni | 5 | 600 | 60 | 15 | 100 | 15000 | 86.4 | 8.9 |

4. The method for producing hydrogen according to claim 1, wherein the supported metal catalyst includes the catalytically active metal at an amount of 0.01 wt % to 30 wt % of the mayenite-type compound.

5. The method for producing hydrogen according to claim 1, wherein the supported metal catalyst has a BET specific surface area of 1 to 100 $m^2g^{-1}$.

6. A method for producing hydrogen comprising:
continuously supplying an ammonia gas with a volume fraction of 0.1 to 100% to a catalyst layer comprising supported metal catalyst packed in a reactor; and
performing contact decomposition reaction at a reaction temperature of 350° C. to 800° C.,
wherein the supported metal catalyst comprises
a support comprising a mayenite-type compound which includes oxygen ions which has not been made to include $10^{15}$ $cm^{-3}$ or more of conduction electrons or hydrogen anions, and
particles of catalytically active metal for ammonia decomposition which are supported on a surface of the support,
wherein the contact decomposition reaction is performed at a weight hourly space velocity (WHSV) of 500 /$mlg^{-1}h^{-1}$ or more.

7. The method for producing hydrogen according to claim 6, wherein the contact decomposition reaction is performed at a pressure of 0.01 MPa to 1.0 MPa.

8. The method for producing hydrogen according to claim 6, wherein the catalytically active metal comprises at least one selected from the metal elements of Groups VIII, IX, and X.

9. The method for producing hydrogen according to claim 6, wherein the supported metal catalyst includes the catalytically active metal at an amount of 0.01 wt % to 30 wt % of the mayenite-type compound.

10. The method for producing hydrogen according to claim 6, wherein the supported metal catalyst has a BET specific surface area of 1 to 100 $m^2g^{-1}$.

* * * * *